United States Patent Office 2,719,056
Patented Sept. 27, 1955

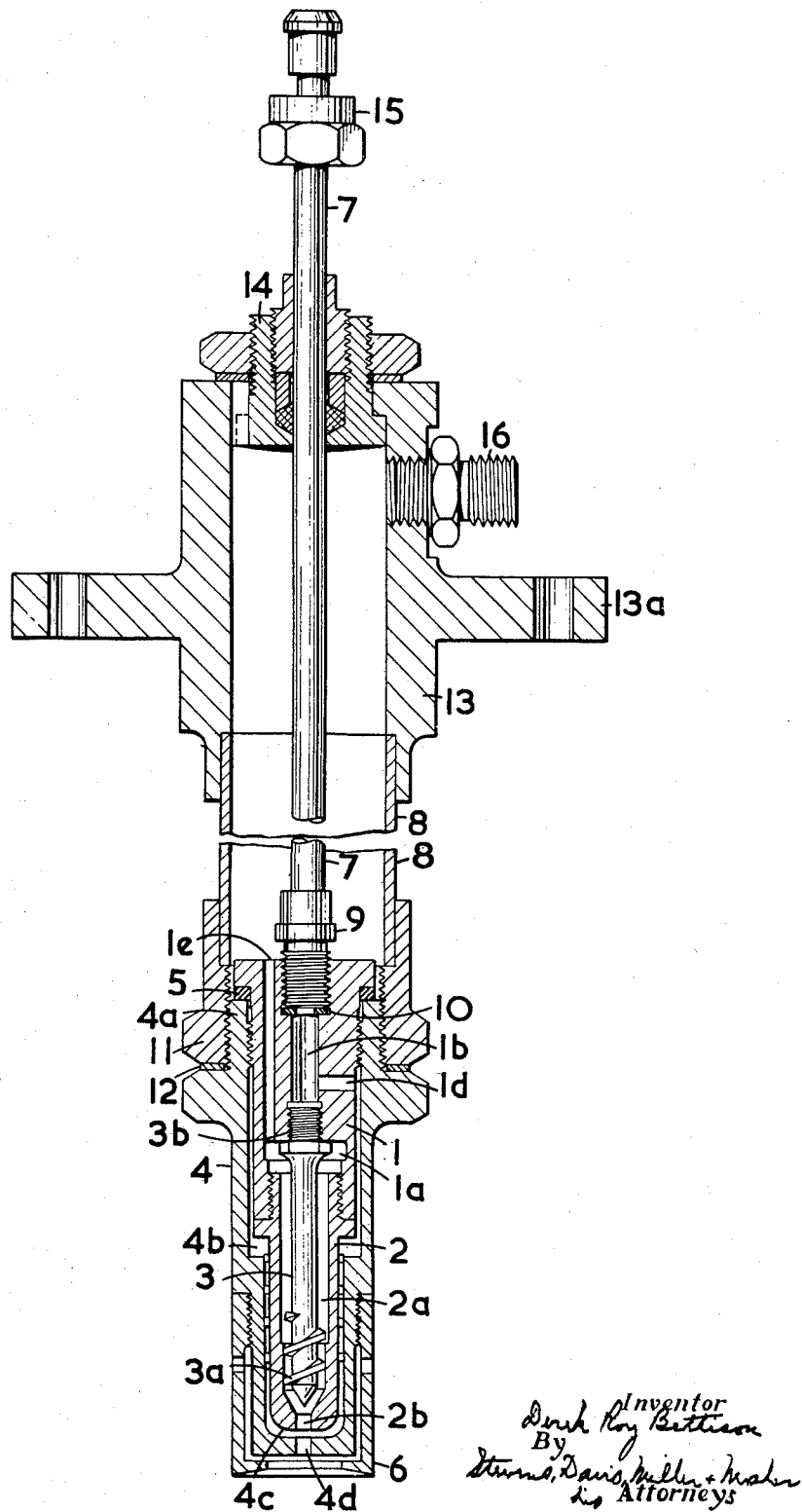

2,719,056

FUEL BURNERS

Derek Roy Bettison, Guildford, England, assignor to Power Jets (Research and Development) Limited, London, England, a British company Application November 5, 1951, Serial No. 254,881

Claims priority, application Great Britain November 17, 1950

2 Claims. (Cl. 299—140)

This invention relates to a fuel injector for injecting atomised liquid fuel into a combustion chamber, e. g. that of a combustion turbine plant. The injector is of the air-blast type, i. e. one in which a blast of gas or vapour (hereinafter called air) under pressure atomises the fuel and carries it into the combustion space.

The invention provides an injection device which projects into the combustion chamber but is fastened in position from outside the chamber so that it can be readily withdrawn for examination or repair. Thus according to the invention the injector proper is on the lower end of a hollow stem which can be inserted through a hole in the chamber wall, and provided with a flange or fixing head on the upper end for fastening to the outside of the chamber wall; the stem is formed by one tube nested inside another constituting fuel and air supply ducts to the injector, means being provided for connecting the upper end of one tube to one supply and the upper end of the other tube to the other supply. Preferably, the air for the blast surrounds the fuel supply duct where it passes through the combustion chamber to the injector proper and so helps to keep the fuel cool; for this purpose, the supply connections are such that the fuel is supplied to the inner tube and the air to the annular space between the tubes.

The injector at the lower end of the stem may be of the kind having a longitudinal and usually axial bore from which the air blast issues into the combustion space and a fuel chamber around this bore communicating with this bore by a fuel passage through which fuel passes radially inwardly into the air jet—preferably at right angles thereto—before the air jet enters the combustion space. This fuel passage—which will usually be a ring around the air jet through which the fuel flows radially inwardly—may conveniently be formed by a narrow gap between opposed faces of a body axially bored for the air jet and of an outer casing which forms the fuel chamber around the body. Such an arrangement is the subject of co-pending United States patent application Serial No. 249,651, in the name of Heath, filed October 4, 1951. When such an injector is used it is an important feature of the present invention that transfer ports are provided, connecting the central air bore of the injector with the outer annular space in the stem and connecting the outer chamber of the injector with the central fuel duct in the stem.

One particular construction according to the invention is shown in longitudinal section in the accompanying drawing. This construction includes an air-blast injector of which the hollow cylindrical body consists of an axially bored upper body 1 and a lower body 2 screwed into the upper body to form therewith the central air-blast passage 2$^a$ with a discharge aperture 2$^b$ at the bottom. A stem 3 with a helical thread 3$^a$ in this air passage for imparting a swirling motion to the air is screwed into the upper body 1 as described hereinafter in more detail. The two-part body is screwed into the upper part 4$^a$ of an outer casing 4 until the shouldered upper body 1 engages the washer 5 bearing against the upper end of casing 4; a clearance space 4$^b$ within the casing 4 around a large part of the body forms the fuel chamber. The narrow gap 4$^c$ between the lower end of the lower body 2 and the bottom of the interior of the casing 4 forms an annular passage through which fuel from the fuel chamber 4$^b$ can pass radially inwards to enter the air jet from the aperture 2$^a$ just before the jet issues through an aperture 4$^d$ in the bottom of the outer casing 4 into the combustion space. A shroud 6 serving in known manner for cooling the end of the injector may be screwed on to the lower end of the casing 4.

The injector so far described is of a kind set forth in co-pending United States patent application Serial No. 249,651 of H. H. Heath and its mode of operation therefore need not be described. It is pointed out that in this injector the fuel chamber surrounds the air-blast passage. According to the present invention the injector is carried on the lower end of a stem comprising nested tubes 7 and 8; the fuel duct through the stem is the inner tube 7 so that in the stem the gas duct, which is formed by the outer tube 8, surrounds the fuel duct, and transfer ports are provided to connect the inner tube 7 to the outside fuel chamber in the injector and to connect the outer air duct in the stem to the inner air passage in the injector. Thus the hollow upper body 1 has its interior divided into non-communicating lower and upper bores 1$^a$ and 1$^b$, the lower bore being the larger in diameter and forming part of the air blast passage. The screwed part 3$^b$ of the stem 3 by which the stem is attached to the body serves also to plug up the bottom of the upper bore 1$^b$. A union 9 on the lower end of the fuel pipe 7 screws into an enlargement of the upper bore 1$^b$, against the washer 10, so that fuel can pass from the pipe 7 to the bore 1$^b$. The outer tube 8 has on its lower end, and preferably secured thereto by welding, the internally threaded ferrule 11 which screws on to the upper end of the outer casing 4 against the washer 12 bearing against the enlarged portion of the casing 4. A head 13 mounted on and preferably welded to the upper end of outer tube 8 is of such diameter as to be a good fit in a hole in the outer wall of the combustion chamber in which the injector is to be fixed, and the flange 13$^a$ on the head has holes for bolting it to the said outer wall of the combustion chamber. The inner and fuel pipe 7 passes through the head 13 and through a packed gland 14 in the head. A union 15 on the free end of the pipe 7 can connect this pipe to a fuel-supply pipe. Similarly member 16 screwed into the head 13 can connect the air supply to the interior of the head and thence to the interior of the outer or air pipe 8. When the whole device is fixed in position it is possible, by disconnecting fuel and air supplies, unbolting the flange on the head 13 and grasping the head, to pull the complete injector and stem unit out of the combustion chamber for inspection or repair. One or more radial holes 1$^d$ drilled into the bore 1$^b$ of the upper body 1 from outside the body serve as fuel transfer ports connecting the inner tube or fuel duct in the stem with the outer fuel chamber in the injector. One or more longitudinal holes 1$^e$ drilled from the top of the upper body 1 into the lower and larger bore 1$^a$ and beside the upper bore 1$^b$ serve as air transfer ports connecting the inner air blast passage in the injector with the outer air duct—which surrounds the fuel duct—in the stem.

What I claim is:

1. A burner assembly for combustion apparatus comprising two nested tubes constituting a stem; a fixing head at the upper end of said stem; means on the upper side of said fixing head for connecting the inner of said nested tubes to a liquid fuel supply and the outer of said tubes to a gas supply; and a gas-blast atomizing type fuel injector fixed to the lower end of said stem, said fuel injector being formed internally, firstly with a gas-blast passage aligned with the stem and terminating in a discharge orifice at the end of the injector remote from the stem, a fuel chamber around said gas-blast passage, and a fuel passage leading from said fuel chamber transversely into said gas-blast passage, and secondly with two transfer ports, one, being separate from said fuel chamber, connecting the outer of said nested tubes with said gas-blast passage and the other connecting the inner of said tubes with said fuel chamber around said gas-blast passage.

2. A burner assembly according to claim 1 in which said burner comprises a body formed internally with upper and lower non-communicating axial bores aligned with the stem, and terminating in orifices at the upper and lower ends respectively of said body, and a casing on said body having a part surrounding the body with radial clearance to define therewith an annular space constituting said fuel chamber and a part spaced from the end of said body to define an annular gap constituting said transverse fuel passage, said part having a central aperture aligned with said orifice at the lower end of said body, wherein said upper axial bore receives said inner tube of the stem while the lower axial bore constitutes part of said gas-blast passage, and said body is formed also with a hole passing transversely from said fuel chamber outside the body into said upper bore to constitute one of said transfer ports and a hole passing along the body from said outer tube into said lower bore to constitute the other of said transfer ports.

References Cited in the file of this patent

UNITED STATES PATENTS

| | | |
|---|---|---|
| 1,474,603 | Morse | Nov. 20, 1923 |
| 1,594,641 | Starr | Aug. 3, 1926 |
| 1,655,222 | Elze | Jan. 3, 1928 |
| 2,139,819 | Graetz | Dec. 13, 1938 |

FOREIGN PATENTS

| | | |
|---|---|---|
| 402,437 | Great Britain | Nov. 27, 1933 |